United States Patent
Keller et al.

(10) Patent No.: US 8,119,010 B2
(45) Date of Patent: Feb. 21, 2012

(54) MAGNETIC FIELD ENHANCED CAKE-FILTRATION SOLID-LIQUID SEPARATIONS

(75) Inventors: Karsten Keller, Hockessin, DE (US); Christopher M. Rey, Hockessin, DE (US); Benjamin Fuchs, Karlsruhe (DE); Christian Hoffmann, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 866 days.

(21) Appl. No.: 11/060,001

(22) Filed: Feb. 17, 2005

(65) Prior Publication Data
US 2005/0252864 A1    Nov. 17, 2005

Related U.S. Application Data

(60) Provisional application No. 60/545,063, filed on Feb. 17, 2004, provisional application No. 60/552,581, filed on Mar. 12, 2004.

(51) Int. Cl.
*B01D 29/00* (2006.01)
*B01D 35/06* (2006.01)

(52) U.S. Cl. ........ 210/695; 210/223; 210/702; 210/767; 210/771; 210/800; 210/806

(58) Field of Classification Search .......... 210/695, 210/702, 767, 771, 800, 806, 223; 204/554, 204/557, 660, 664
See application file for complete search history.

(56) References Cited

U.S. PATENT DOCUMENTS

| | | | |
|---|---|---|---|
| 1,527,069 A | 2/1925 | Peck | |
| 1,527,070 A | 2/1925 | Peck | |
| 2,648,636 A | 8/1953 | Ellis | |
| 3,195,728 A * | 7/1965 | Sommermeyer | 210/223 |
| 3,534,902 A | 10/1970 | Gilreath | |
| 3,696,932 A * | 10/1972 | Rosenberg | 210/437 |
| 3,902,994 A | 9/1975 | Maxwell | |
| 4,017,385 A | 4/1977 | Morton | |
| 4,144,163 A | 3/1979 | Kolm | |
| 4,166,788 A | 9/1979 | Druz | |
| 4,238,326 A | 12/1980 | Wolf | |
| 4,279,748 A * | 7/1981 | Inoue | 210/222 |
| 4,784,758 A | 11/1988 | Willis | |
| 5,183,638 A | 2/1993 | Wakatake | |
| 5,244,580 A * | 9/1993 | Li | 210/695 |
| 5,565,105 A | 10/1996 | Thakor | |
| 5,954,933 A | 9/1999 | Ingalls | |
| 6,150,182 A | 11/2000 | Cassaday | |
| 6,273,265 B1 | 8/2001 | Greenwalt | |

(Continued)

FOREIGN PATENT DOCUMENTS
EP    659932    6/1995
(Continued)

OTHER PUBLICATIONS

International Search Report and Written Opinion in International Applic. No. PCT/US2005/005043 dated Sep. 9, 2009 (European Patent Office, NL-2280 HV Rijswijk).

(Continued)

*Primary Examiner* — David A Reifsnyder

(57) ABSTRACT

This invention relates to an improved cake-filtration solid-liquid separation process wherein the improvement comprises simultaneously subjecting the solid-liquid mixture to a homogeneous magnetic field, a magnetic field gradient or both and cake-filtration to accomplish separation.

18 Claims, 4 Drawing Sheets

U.S. PATENT DOCUMENTS

| | | |
|---|---|---|
| 6,464,863 B1 | 10/2002 | Nguyen |
| 6,517,813 B1 | 2/2003 | Weitschies |
| 7,070,684 B1 | 7/2006 | Fuhr |
| 2003/0146174 A1* | 8/2003 | Hansen et al. ............ 210/400 |
| 2005/0261479 A1 | 11/2005 | Hoffmann |
| 2006/0180538 A1 | 8/2006 | Fuchs |
| 2006/0191834 A1 | 8/2006 | Fuchs |
| 2006/0281194 A1 | 12/2006 | Fuchs |

FOREIGN PATENT DOCUMENTS

| | | |
|---|---|---|
| FR | 2128128 | 10/1972 |
| GB | 1490598 | 11/1977 |
| GB | 2153707 | 8/1985 |
| JP | 53-109272 | 9/1978 |
| JP | 58-088043 | 5/1983 |
| JP | 61-106519 | 5/1986 |
| JP | 62-079861 | 4/1987 |
| JP | 09-276624 | 10/1997 |
| JP | 2000-312838 | 11/2000 |
| JP | 2003-144973 | 5/2003 |

OTHER PUBLICATIONS

International Search Report and Written Opinion in International Applic. No. PCT/US2005/005045 dated May 24, 2005 (European Patent Office, NL-2280 HV Rijswijk).

International Search Report and Written Opinion in International Applic. No. PCT/US2006/005774 dated Jun. 28, 2006 (European Patent Office, NL-2280 HV Rijswijk).

International Search Report and Written Opinion in International Applic. No. PCT/US2006/005773 dated Jun. 28, 2006 (European Patent Office, NL-2280 HV Rijswijk).

* cited by examiner

MAGNETIC FIELD ENHANCED CAKE-FILTRATION SOLID-LIQUID SEPARATIONS

This application claims the benefit of U.S. Provisional Applications No. 60/545,063, filed Feb. 17, 2004; and 60/552,581, filed Mar. 12, 2004; each of which is incorporated in its entirety as a part hereof for all purposes.

This in invention is related to work performed by E.I. du Pont de Nemours and Company under DOE Agreement No. DE-FC36-99GO10287, and the U.S. Government may have certain rights in this invention.

FIELD OF THE INVENTION

This invention relates to an improved cake-filtration solid-liquid separation process wherein the improvement comprises simultaneously subjecting the solid-liquid mixture to a magnetic field and cake-filtration to accomplish separation.

BACKGROUND OF THE INVENTION

The use of solid-liquid separations is widespread and ranges from the large volume separations of minerals from solid-liquid mixtures to the small batch separations of high value products in the biotechnology or pharmaceutical industries. Gravitation, pressure, temperature, centrifugation, and fluid dynamics have dictated traditional solid-liquid separation for the past 50 years. Traditional solid-liquid separation typically consists of two primary steps. The first step is a mechanical step in which the solid particulate is separated from the liquid by mechanical means. The mechanical means can be mechanical pressure such as applied by a piston, gas pressure, hydrodynamic pressure, gravitational pressure, centrifugal pressure or a combination thereof wherein the liquid passes through a filter and the solid is retained by the filter. One problem encountered is solid loss as a result of solid "breaking through", i.e., passing through, the filter. An even more serious problem is that the mechanical separation step does not result in a complete separation. This necessitates the second step, a thermal drying process. The thermal drying process is very much less energy efficient, a factor of over 100-200 times less energy efficient, than the mechanical step. Since enormous volumes of materials are processed each year, more efficient mechanical solid-liquid separations will result in dramatic reductions in overall energy consumption by reducing downstream drying requirements. This would impact energy consumption since thermal drying accounts for a significant portion of total worldwide energy consumption.

In some instances, high-gradient magnetic field separation has been used to separate particular magnetic solids from a mixture of solids in a liquid.

An object of the present invention is to provide a more efficient and faster process for cake-filtration solid-liquid separation.

SUMMARY OF THE INVENTION

This invention provides an improved process for cake-filtration solid-liquid separation of a solid-liquid mixture containing magnetic particles, the improvement comprising simultaneously subjecting the solid-liquid mixture to a homogeneous magnetic field, a magnetic field gradient or both and the mechanical means used to provide the pressure needed to drive the cake-filtration process. The mechanical means is selected from the group consisting of mechanical pressure, gas pressure, hydrostatic pressure, hydrodynamic pressure, gravitational pressure, or a combination thereof.

The improved process of the instant invention is effective when the solid-liquid mixture contains ferromagnetic, paramagnetic or diamagnetic solids or when the solid-liquid mixture is seeded with ferromagnetic or paramagnetic particles. The improved process is also effective when magnetic particles are attached to the solids to be separated, i.e., when "functionalized magnetic beads" are used.

This invention also provides for subjecting a solid-liquid mixture containing magnetic particles to a homogeneous magnetic field, a magnetic field gradient or both prior to the cake-filtration separation process to promote agglomeration of the magnetic particles.

Homogeneous magnetic fields with field strengths $\geq 0.01$ T have been found to be useful in the instant process. Magnetic field gradients $\geq 1$ T/m have been found to be useful in the instant process.

DETAILED DESCRIPTION OF THE PREFERRED EMBODIMENTS

Figure 1:
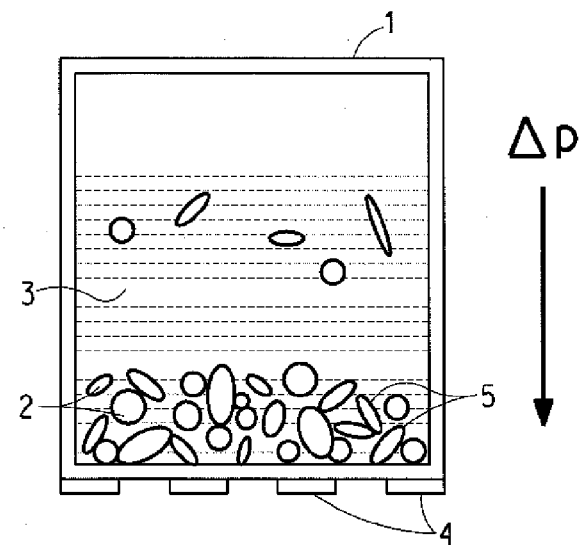
FIG. 1 illustrates a classical cake-filtration process.

The classical cake-filtration process uses pressure to separate a solid-liquid mixture. When the solid-liquid system is subjected to a pressure, the solid particulates are held back by the filter media, which results in the building-up of a filter-cake as illustrated in FIG. 1. FIG. 1 shows a container 1 containing a solid 2-liquid 3 mixture and a filter media 4. A pressure is applied to the solid-liquid mixture so that the pressure at the top of the mixture exceeds the pressure at the filter media by an amount Δp. The filtration effect is not only due to the filter media, but it is also due to the particles that build bridges 5 on top of the pores of the filter media. If a product specific volume concentration of solids is not exceeded, the bridge building cannot take place and the particles flow through the filter media and end up in the filtrate. Loss of product through the filter media is especially deleterious for high value products, e.g. bio-products, and therefore must be avoided.

Once the particle bridges have been established, the height of the filter-cake at the filter media begins to grow. As the filter-cake height increases, the filter-cake resistance correspondingly increases. This means that the flow resistance for the liquid phase through the porous system is also increasing with filtration time.

Simple models have been developed that theoretically describe the mechanism for cake building. The models that have been developed are derived from the Darcy equation for the one phase flow through a porous system. The classical cake building expression is given by the linear equation:

$$\frac{t}{V_L} = \frac{\eta_L \cdot r_c \cdot \kappa}{2 \cdot \Delta p \cdot A^2} \cdot V_L + \frac{\eta_L \cdot R_m}{\Delta p \cdot A} \qquad \text{Eq. (1)}$$

where,
- t: filtration time
- $V_L$: filtrate volume
- $\eta_L$: viscosity of the liquid phase
- $r_c$: specific cake resistance
- $\kappa$: concentration parameter
- $\Delta p$: pressure difference
- A: filter area
- $R_m$: the filter media resistance.

To simplify the expression in Eq. (1), two variables (a) and (b) are defined such that:

$$a = \frac{\eta_L \cdot r_c \cdot \kappa}{2 \cdot \Delta p \cdot A^2} \qquad \text{Eq. (2)}$$

and $$b = \frac{\eta_L \cdot R_m}{\Delta p \cdot A}. \qquad \text{Eq. (3)}$$

Substitution of Eq.'s (2) and (3) into Eq. (1) results in the simplified linear equation given by:

$$\frac{t}{V_L} = a \cdot V_L + b \qquad \text{Eq. (4)}$$

In Eq. (4) the slope (a) is directly proportional to the specific cake resistance and the y-axis intercept (b) is directly proportional to the filter media resistance. From Eq. (4) a simple cake-filtration experiment can be designed and the results provide the $t/V_L$ versus $V_L$ diagram. A decrease of the slope is directly related to faster cake building kinetics.

The instant invention provides an improved cake-filtration process for solid-liquid separation. The improvement comprises subjecting the solid-liquid mixture to a homogeneous magnetic field, a magnetic field gradient or both while undergoing the cake-filtration process. In one embodiment an oscillating magnetic field is used in conjunction with cake-filtration.

The improvements that result from the application of the homogeneous magnetic field are due to structure changes within the mixture or the porous structure of the filter-cake. A homogeneous, i.e., uniform, magnetic field provides a torque that can align or anti-align magnetic particles. Thus, the applied homogeneous magnetic field changes the structure of the solid-liquid mixture and of the filter cake, i.e., the filter plus the solid retained by the filter. The solid particles agglomerate in the presence of the magnetic field. When the particles agglomerate, they increase their effective diameter. The time it takes for solid particulates to settle in a liquid medium is proportional to the reciprocal of the square of the diameter of the particulate. Therefore the agglomeration of particles results in a decrease in the time for solid-liquid separation. The homogeneous field can be applied at any angle with respect to the direction of the pressure driving the cake-filtration process. It can be parallel to, anti-parallel to, and perpendicular to or at some other angle to the direction of the pressure, whatever proves most effective for the particular solid-liquid mixture.

Often at the beginning of a cake-filtration process, the filtrate is not clear since a significant fraction of the solid particles pass through the filter media. In most industrial mineral separation processes, this is tolerated because the value, i.e., the cost per unit mass, of the mineral material is relatively low. The economics of the situation is drastically different when processing high value materials, where loss of material in the filtrate is unacceptable. For example, for the processing of "functionalized magnetic beads" that are attached to target materials such as proteins, DNA plasmids, cells, etc., any loss of material would be economically significant since some of such materials are valued at upwards of $100,000 per kg. "Functionalized magnetic beads" are magnetic particles that are "functionalized" by treating their surfaces with a biological or chemical entity known to bind to the targeted biological material. Application of a uniform magnetic field results in a reduced loss of material to the filtrate. It is believed this is mainly due to the effects of agglomeration.

It is also advantageous to subject the solid-liquid mixture to a homogeneous magnetic field prior to the solid-liquid mixture being subjected to mechanical means of separation in order to agglomerate the solid particles. Following this agglomeration step, the solid-liquid can be subjected to an additional homogeneous magnetic field, a magnetic field gradient or both in conjunction with cake-filtration process.

The agglomeration of the particles plays an important role in the improvement of the separation step. This agglomeration also reduces the need for the addition of flocculants, e.g., long-chain polymers, to improve process performance and thereby results in a smaller amount of chemicals needed to process the product.

With a magnetic field gradient there is a magnetic force on the magnetic particles, i.e., the ferromagnetic, paramagnetic or diamagnetic particles, present in the solid-liquid mixture. The magnetic force can significantly influence the particle movement during the cake-filtration process. The magnetic field gradient can also contribute to agglomeration with the advantages discussed previously.

The magnetic force provided by the magnetic field gradient can affect the separation process in various ways depending upon the orientation of the magnetic force.

The magnetic force can be oriented in the same direction as the force provided by the mechanical means. For example, when the mechanical means is the gravitational force and it is being used in a settling process, a magnetic force in the same direction as the gravitational force accelerates the settling process of the magnetic solid particles.

Alternatively, the magnetic force can be oriented in the opposite direction to the force provided by the mechanical means. In one instance, when the mechanical means is gas pressure and it is being used in a cake-filtration process, a magnetic force in the direction opposite to the force provided by the gas pressure results in a decrease in the filter cake resistance so that the liquid more readily passes through the filter cake. As a result, the separation process is accelerated.

The use of a homogeneous magnetic field, a magnetic field gradient or both in conjunction with the mechanical means improves both the static and kinetic aspects of the solid-liquid separation. Some of the advantages of the instant invention are:

1) A reduction of solid breakthrough, which occurs particularly in the beginning of a filtration process in the absence of a homogeneous magnetic field or a magnetic field gradient. The reduction of solid breakthrough results in a significant reduction in solid loss. This is especially important for separations of high value products in the chemical, biotechnology or pharmaceutical industries.

2) A faster process for separating the solid-liquid mixture. The benefits are shorter residence times, a reduction in the necessary separation area and/or higher throughput.
3) A reduction in the residual liquid content of the filter and the solid retained by the filter. This is very important since it significantly reduces the operation costs of the thermal drying step. It also results in better handling properties for conveyance to down-stream treatments.
4) A reduction of the time to reach gas breakthrough. Gas breakthrough occurs when the cake-filtration separation process has proceeded to the stage that the gas providing the pressure to drive the cake-filtration process passes through the filter. This shows that subjecting it to a magnetic field can change the particle interaction of fine and very weak magnetic material. This effect can be exploited in other separation processes.

The magnetic particles in the solid-liquid mixture can be ferromagnetic, ferrimagnetic, anti-ferromagnetic, paramagnetic or diamagnetic. The solid-liquid mixture can also be seeded with ferromagnetic or paramagnetic particles to promote separation. The improved process is also effective when "functionalized magnetic beads" are used, i.e., when magnetic particles are attached to the solids to be separated. Costly biomaterials can be attached to such magnetic particles in order to facilitate the separation process and reduce the loss of the costly biomaterial. "Magnetic particles" as used herein includes all of the magnetic materials mentioned in this paragraph.

The solid-liquid mixture can include flocculents, surfactants, and sols. The solid-liquid mixture could alternatively be referred to as a suspension.

For solids having weaker magnetic properties, superconductor magnets can provide high magnetic field strengths useful in enhancing the separation.

Four different materials of varying degrees of magnetic susceptibility ($\chi_m$) were used in most of the Examples of the invention. The four materials are: 1) titanium dioxide, $TiO_2$, obtained from E. I. du Pont de Nemours and Company, Wilmington, Del., 2) hematite, $Fe_2O_3$ 601, obtained from Atlantic Equipment Engineers, Bergenfield, N.J., 3) natural hematite, $Fe_2O_3$ F&S, obtained from Frank & Schulte GMBH, Essen, Germany and 4) magnetite, $Fe_3O_4$, obtained from Höganäs AB, Höganäs, Sweden. Pertinent physical properties of these materials, i.e., density, particle size, and magnetic susceptibility, are given in Table I.

TABLE I

| Material | $TiO_2$ | $Fe_2O_3$ (601) | $Fe_2O_3$ (F&S) | $Fe_3O_4$ |
|---|---|---|---|---|
| Density $\rho$ g/cm$^3$ | 4.3 | 4.8-5.2 | 4.9 | 5 |
| Median particle size μm | 1.04 | 0.6 | 4.72 | 1.27 |
| Magnetic susceptibility $\chi_m$(cgs) | $<3 \times 10^{-7}$ | $\approx 10^{-4}$ | paraferro $\approx$ 1 | ferro. |

All experiments were performed with de-ionized water as the liquid phase. All experiments were performed using air pressure to drive the cake-filtration process.

The apparatus used in the Examples consisted of a modified CUNO filter rigidly mounted at the center of a non-magnetic plastic frame. The plastic frame supporting the CUNO filter was then rigidly mounted within the internal bore of a high temperature superconducting (HTS) solenoidal magnet. The CUNO filter could then be placed at various locations along the magnet's central axis. Thus, if the CUNO filter were placed at the axial center of the magnet, the filter and its corresponding product would experience a homogeneous B-field. Likewise, if the CUNO filter were placed at the far ends of the axis of the magnet, the filter and its product would experience a magnetic field gradient. The HTS magnet consisted a warm bore inner diameter of 20 cm, a height of 30 cm, with a maximum central magnetic field of 3.0 T. Computer modelling was used to calculate the magnetic field distribution of the HTS solenoid coil and hence determine parameters such as the degree of B-field homogeneity or strength of the B-field gradient.

The filter unit that was used for the solid-liquid filtration experiments was purchased from CUNO Inc., Meriden, CT. The CUNO filter was modified to decrease its height for the experiments of the Examples. The filter specifications are listed in Table II.

TABLE II

| Model | Tri-47 |
|---|---|
| Filtration Area | 13.1 cm$^2$ |
| Filter height | 8.62 cm |
| Max. pressure | 60 psi |
| Reservoir volume | 150 ml |
| Filter Mesh Type/Size | Nylon/1 μm |

EXAMPLES OF THE INVENTION

Example 1

The purpose of this Example is to study the fundamentals of the cake building process in the presence of a homogeneous magnetic field, B-field, applied perpendicular to the direction of the air pressure. Experiments were performed using ferromagnetic magnetite, $Fe_3O_4$, as the solid in the solid-liquid mixture. The concentration of the magnetite was 11 volume percent. Separate runs were carried out with homogeneous magnetic strengths of 0 T, 0.03 T, 0.05 T, 0.1 T and 0.5 T. The air pressure used in each run was 1.6 bar. Even a relatively small homogeneous B-field significantly altered the filter-cake structure. At applied B-fields of 0.03 T or more, a filter-cake build-up could not be observed as a result of the destruction of the cake structure itself. This made it impossible to study the fundamentals of the cake building process in the presence of a B-field using $Fe_3O_4$. However, the dramatic change in filter-cake structure for $Fe_3O_4$ can be exploited to improve the separation process when $Fe_3O_4$ is present in the solid-liquid mixture.

Example 2

The purpose of this Example is to demonstrate the reduction in material lost to the filtrate when a homogeneous magnetic field is applied during a cake-filtration process.

A mixture of ferromagnetic magnetite, $Fe_3O_4$, and water was prepared. The concentration of the magnetite was 11 volume percent. The mixture was divided into 8 equal portions, each of 15 g, so that 8 separate runs could be carried out. Each portion in turn was placed in the cake-filtration apparatus with the CUNO filter. The air pressure used in each of the eight runs was 1.6 bar. The first four separate experimental runs were carried out with no applied magnetic field. The mass of the solid in the filtrate was determined gravimetrically. The average of the solid mass in the filtrate of these four runs was 0.135 g. The second four separate experimental runs were carried out in a homogeneous magnetic field of 0.03 T. The direction of the homogeneous magnetic field was perpendicular to the direction of the pressure. The average of the solid mass in the filtrate of these four runs was 0.025 g. This shows an 80% reduction in the solid filtrate mass, i.e., the solid breakthrough. The application of an external B-field resulted in a reduced loss of material to the filtrate. It is believed that the reduction is primarily due to agglomeration of the particles, i.e., to agglomerates, which are now too large to pass through the filter media. The $Fe_3O_4$ material used for these experiments is in the same particle size range as many of the mentioned commercial "magnetic beads" now gaining popularity for use as "functionalized magnetic beads" in high value bio-separations. This Example demonstrates that the use of the improved cake-filtration process of the instant invention can improve the efficiency and economics of such bio-separations.

Example 3

The purpose of this Example is to demonstrate the reduction in the residual moisture of the filter-cake when cake-filtration is carried out in the presence of a homogeneous magnetic field.

Figure 2:
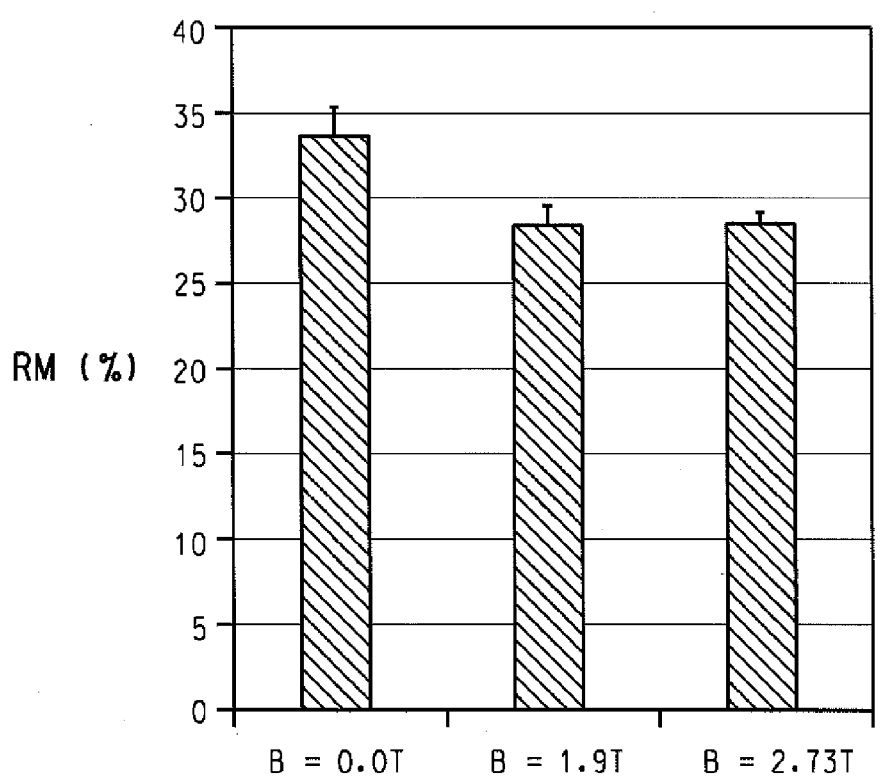
FIG. 2 shows the reduction in the residual moisture of a filter-cake when the cake-filtration process is carried out in the presence of a homogeneous magnetic field.

The residual moisture (RM) is used to quantify the amount of liquid that remains trapped inside the filter-cake after the de-watering equilibrium is achieved, i.e., when no more liquid passes through the filter even though the pressure contains to be applied. The lower the RM, the more effective the mechanical treatment. The more effective the mechanical treatment the lower energy will be consumed in the overall solid-liquid separation process. RM is experimentally determined by measuring the mass of liquid trapped relative to the mass of the wet filter-cake. These masses were determined by gravimetric measurements before and after drying the filter cake in an oven. A mixture of water and paramagnetic $Fe_2O_3$ (601) containing 6.16 volume percent $Fe_2O_3$ was prepared and divided into nine portions. Each portion in turn was placed in the cake-filtration apparatus with the CUNO filter. The gas pressure used in each of the runs was run was 2.8 bar. Three cake-filtration processes were carried out with no external magnetic field, three cake-filtration processes with a homogeneous magnetic field of 1.9 T and three cake-filtration processes with a homogeneous magnetic field of 2.73 T. The direction of the homogeneous magnetic field was perpendicular to the direction of the pressure. FIG. 2 shows a plot of the mean residual moisture content for the three conditions of the applied external B-field. The mean RM value and error bars in FIG. 2 are the calculated average and $\sigma_s$ of three separate experimental runs at each of the magnetic field conditions, respectively. Results indicate that the relative reduction in RM is nearly 17% for an applied homogeneous B-filed of 1.9 T and that further increases in the applied homogeneous B-field do not further decrease the RM. Reductions in RM content during the mechanical separation step can have an enormous impact on decreasing the energy consumption during the thermal drying step, hence increasing the energy efficiency, of the solid-liquid separation process.

Example 4

The purpose of this Example is to demonstrate the increase in the rate of cake building in the presence of a inhomogeneous magnetic field.

A mixture of water and paramagnetic $Fe_2O_3$ (F&S) containing 25 volume percent $Fe_2O_3$ was prepared and divided into 20 portions. Each portion in turn was placed in the cake-filtration apparatus with the CUNO filter. The air pressure used in each of the 20 runs was run was 0.8 bar. Four cake-filtration processes were carried out with each of the external inhomogeneous magnetic fields of 0, 0.2 T, 0.4 T, 0.6 T and 0.8 T, respectively. The direction of the inhomogeneous magnetic field gradient was parallel to the direction of the pressure such that the magnetic force on the magnetic particles was opposite in direction to the pressure gradient. The filtrate volume $V_L$ was measured as a function of the filtration time t for each of the 20 runs.

Figure 3:
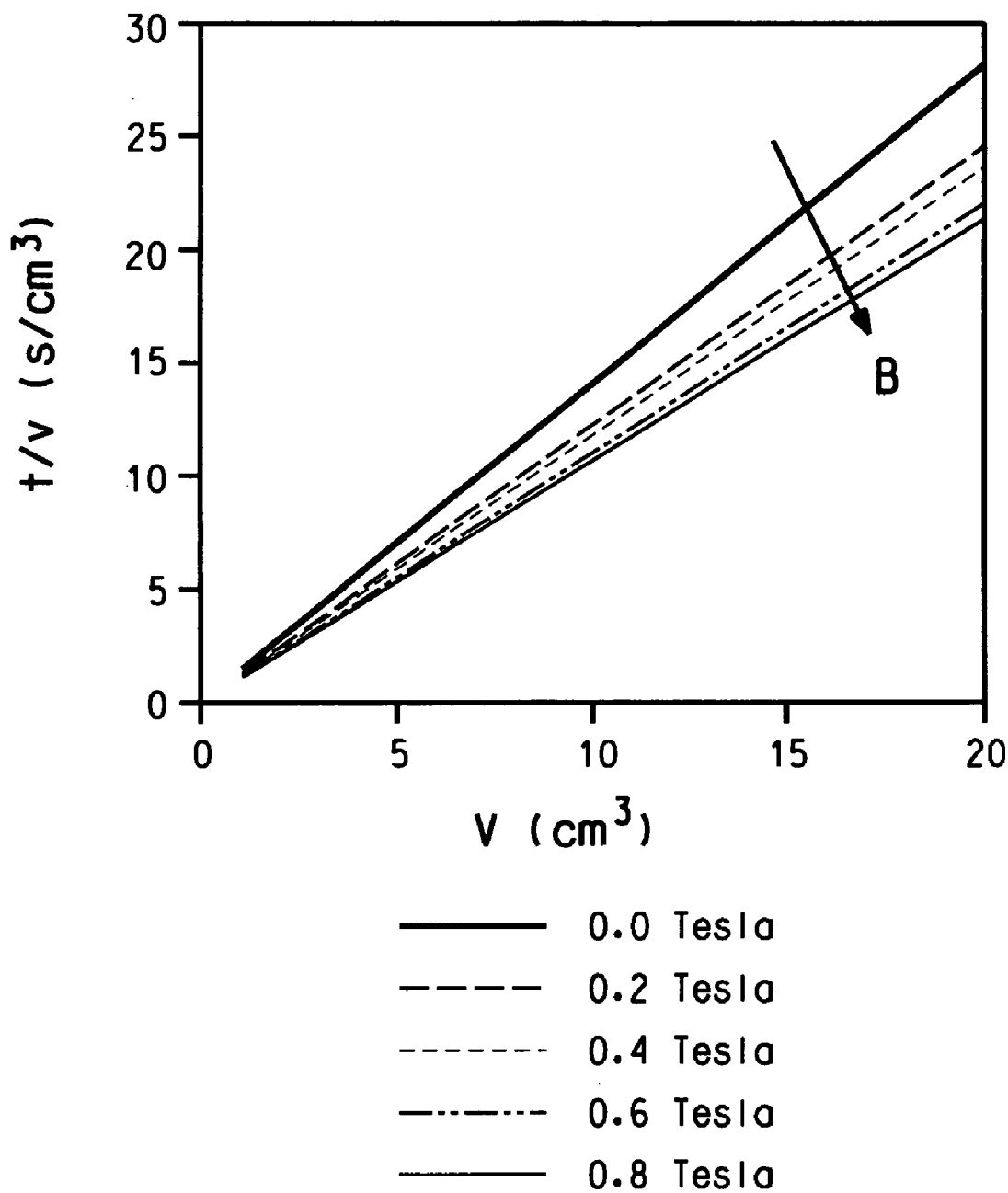
FIG. 3 is a plot of the quantity (filtration time/filtrate volume) versus filtrate volume for cake-filtration processes carried out in the presence of various inhomogeneous magnetic fields.

For the evaluation of the cake building kinetics the $t/V_L$ versus $V_L$ equation discussed above can be used to quantitatively analyze the results. The slope a of the $t/V_L$ versus $V_L$ line is proportional to the specific cake resistance. The mean value of $t/V_L$ for a given value of the inhomogeneous magnetic field was calculated from the four separate experimental runs carried out with that inhomogeneous magnetic field. Shown in FIG. 3 is the mean value of $t/V_L$ versus $V_L$ for the various values of the B-field. The influence of the inhomogeneous B-field on the cake building process can be seen in FIG. 3. As the B-field increases, the slope of the $t/V_L$ curve correspondingly decreases. A decreasing slope implies faster cake building kinetics. An applied B-field of 0.8 T results in a decrease in the cake resistance of about 25% compared to that with no field applied. The primary reason for this improvement is the physical structure change in the filter-cake as it builds in the presence of the external inhomogeneous B-field. This structure change has a positive effect on the liquid flow through the porous medium and the separation process.

Example 5

The purpose of this Example is to demonstrate the acceleration of gas-breakthrough when cake-filtration is carried out in the presence of a homogeneous magnetic field.

A mixture of water and weakly paramagnetic $TiO_2$ containing was prepared and divided into 8 portions. Each portion in turn was placed in the cake-filtration apparatus with the CUNO filter. The air pressure used in each of the 20 runs was run was 3.3 bar. Four cake-filtration processes were carried out with no external magnetic field and with an external homogeneous magnetic field of 2.73 T, respectively. The direction of the homogeneous magnetic field was perpendicular to the direction of the pressure. The time of gas breakthrough was measured for each run.

Figure 4:
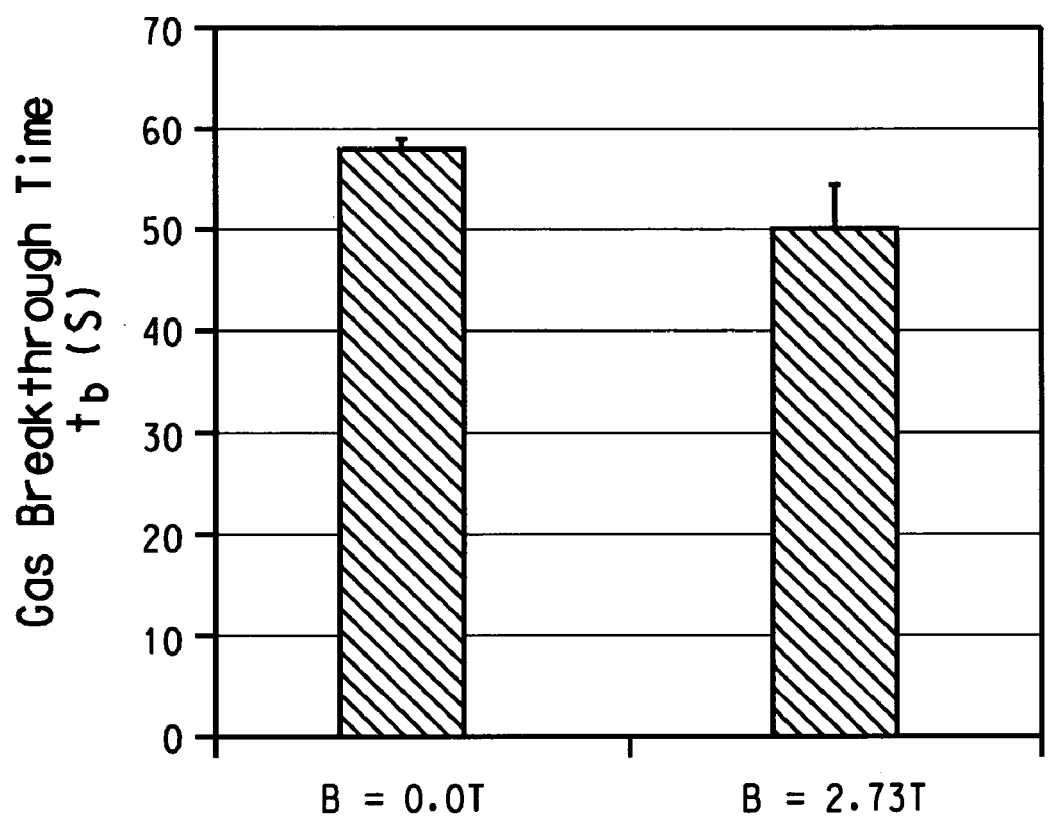
FIG. 4 shows the reduction in gas breakthrough time for cake-filtration processes carried out in the presence of a homogeneous magnetic field.
Figure 5:
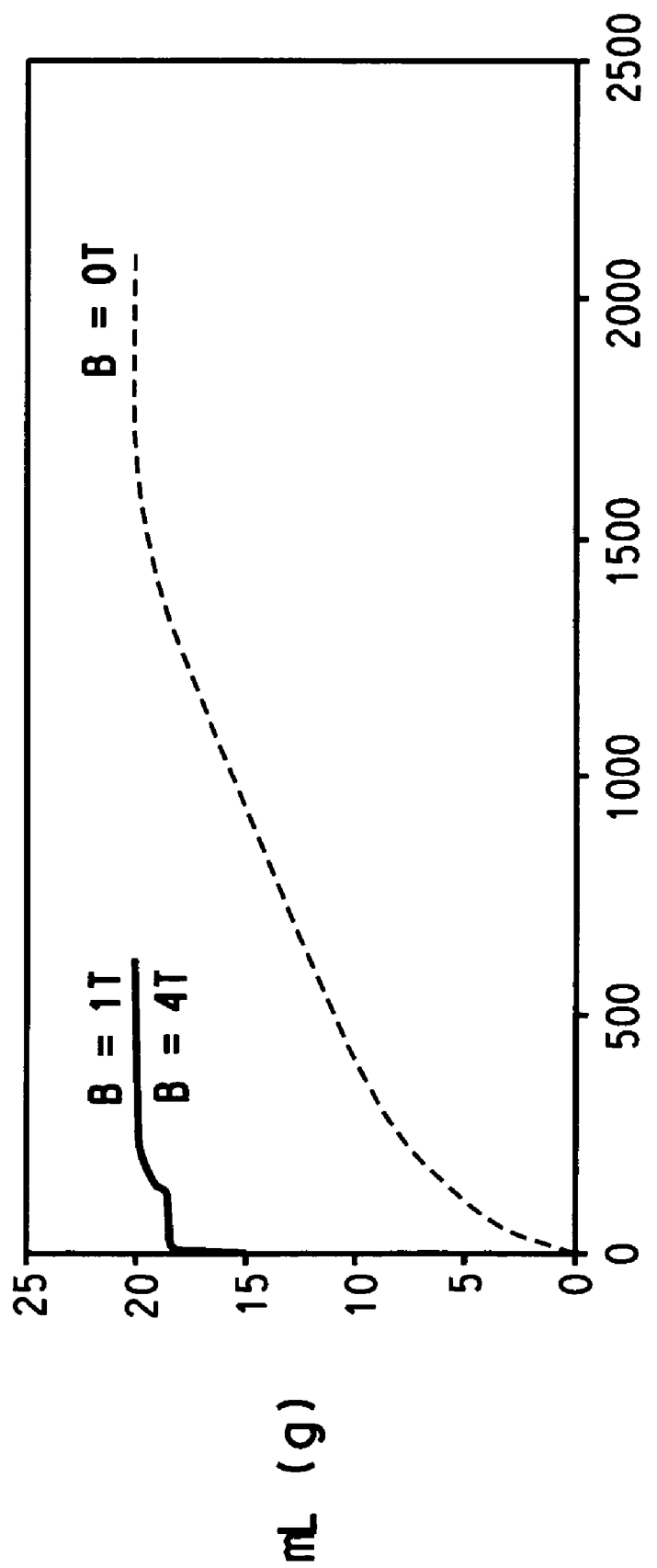
FIG. 5 is a plot of the mass of the liquid passed through the filter versus time for cake-filtration processes carried out in the presence of various inhomogeneous magnetic fields.

FIG. 4 shows the mean gas breakthrough time ($t_b$) for the two different applied B-field conditions, i.e., 0 and 2.73 T. The mean $t_b$ value and error bars in FIG. 4 for each field condition are the calculated average and $\sigma_s$ of four separate experimental runs, respectively. These results show that the gas breakthrough time occurs earlier for the $TiO_2$ subjected to an applied B-field and therefore indicating a faster separation process. It is believed that this effect is due to changes in the particle-particle interaction of the $TiO_2$.

Example 6

The purpose of this Example is to demonstrate the increase in the rate of cake building in the presence of an inhomogeneous magnetic field.

For this Example a piston was used so that this is a press filtration process. Air pressure forced the piston downward and the piston in turn pushed the water through the filter.

A mixture of water and iron oxide inorganic pigment, Bayoxide® E8706 iron oxide inorganic pigment, obtained from Bayer AG, Leverkusen, Germany, containing 16.5 volume percent Bayoxide® E8706 was prepared and divided into 3 portions each containing 60 g of water and iron oxide Bayoxide®. Each portion in turn was placed in the cake-filtration apparatus with the CUNO filter. The air pressure used in each of the 3 runs was run was 0.8 bar. The mass of water that passed through the filter was measured as a function of time. In one run no external magnetic field was applied, i.e., B=0. In the other two runs, an inhomogeneous magnetic field was applied. The field strength in one run was 1 T and in the other run was 4 T. The magnetic field gradient and magnetic force was higher for the 4 T field. The direction of the inhomogeneous magnetic field gradient was such that the magnetic force on the magnetic particles was opposite in direction to the pressure gradient. The magnetic particles responded to the magnetic force by moving toward the piston and away from the filter-cake. The mass of water that passed through the filter was measured as a function of time. The results of the three runs are shown in FIG. 3 where the mass of the liquid that passed through the filter is shown as a function of time. The results with 1 T and 4 T are essentially identical. Applications of these fields improved the speed of the cake building by a factor of 200. These results show that the application of a magnetic field gradient during cake-filtration can make a dramatic improvement in the process kinetics.

What is claimed is:

1. A process for the separation of magnetic particles from a solid-liquid mixture that resides in a container that comprises a filter, comprising
    (a) subjecting the solid-liquid mixture in the container to a homogeneous magnetic field, a magnetic field gradient or both and
    (b) subjecting the solid-liquid mixture in the container to pressure to form a filter cake on the filter in the container.
2. A process according to claim 1 wherein steps (a) and (b) are performed simultaneously.
3. A process according to claim 1 wherein step (a) is performed separately and prior to step (b).
4. A process according to claim 1 wherein step (a) is performed both separately and prior to, and simultaneously with, step (b).
5. A process according to claim 1 wherein a magnetic field is oscillating.
6. A process according to claim 1 wherein the step of subjecting the mixture to pressure comprises a step of subjecting the mixture to mechanical pressure, gas pressure, hydrostatic pressure, hydrodynamic pressure, gravitational pressure, or a combination thereof.
7. A process according to claim 1 wherein the step of subjecting the mixture to pressure comprises a step of subjecting the mixture to gas pressure.
8. A process according to claim 1 wherein the step of subjecting the mixture to pressure comprises a step of subjecting the mixture to air pressure.
9. A process according to claim 1 wherein the field strength of a homogeneous magnetic field is $\geq 0.01$ T.
10. A process according to claim 1 wherein a magnetic field gradient has a magnitude $\geq 1$ T/m.
11. A process according to claim 9 wherein a magnetic field gradient has a magnitude $\geq 1$ T/m.
12. A process according to claim 1 wherein a homogeneous magnetic field is perpendicular to the direction of the pressure.
13. A process according to claim 1 wherein a homogeneous magnetic field is parallel to the direction of the pressure.
14. A process according to claim 1 wherein a homogeneous magnetic field is anti-parallel to the direction of the pressure.
15. A process according to claim 1 wherein the magnetic force provided by a magnetic field gradient is parallel to the direction of the pressure.
16. A process according to claim 1 wherein the magnetic force provided by a magnetic field gradient is anti-parallel to the direction of the pressure.
17. A process according to claim 1 wherein the magnetic particles comprise functionalized magnetic beads attached to biological materials.
18. A process according to claim 1 wherein the filter comprises nylon.

* * * * *